UNITED STATES PATENT OFFICE.

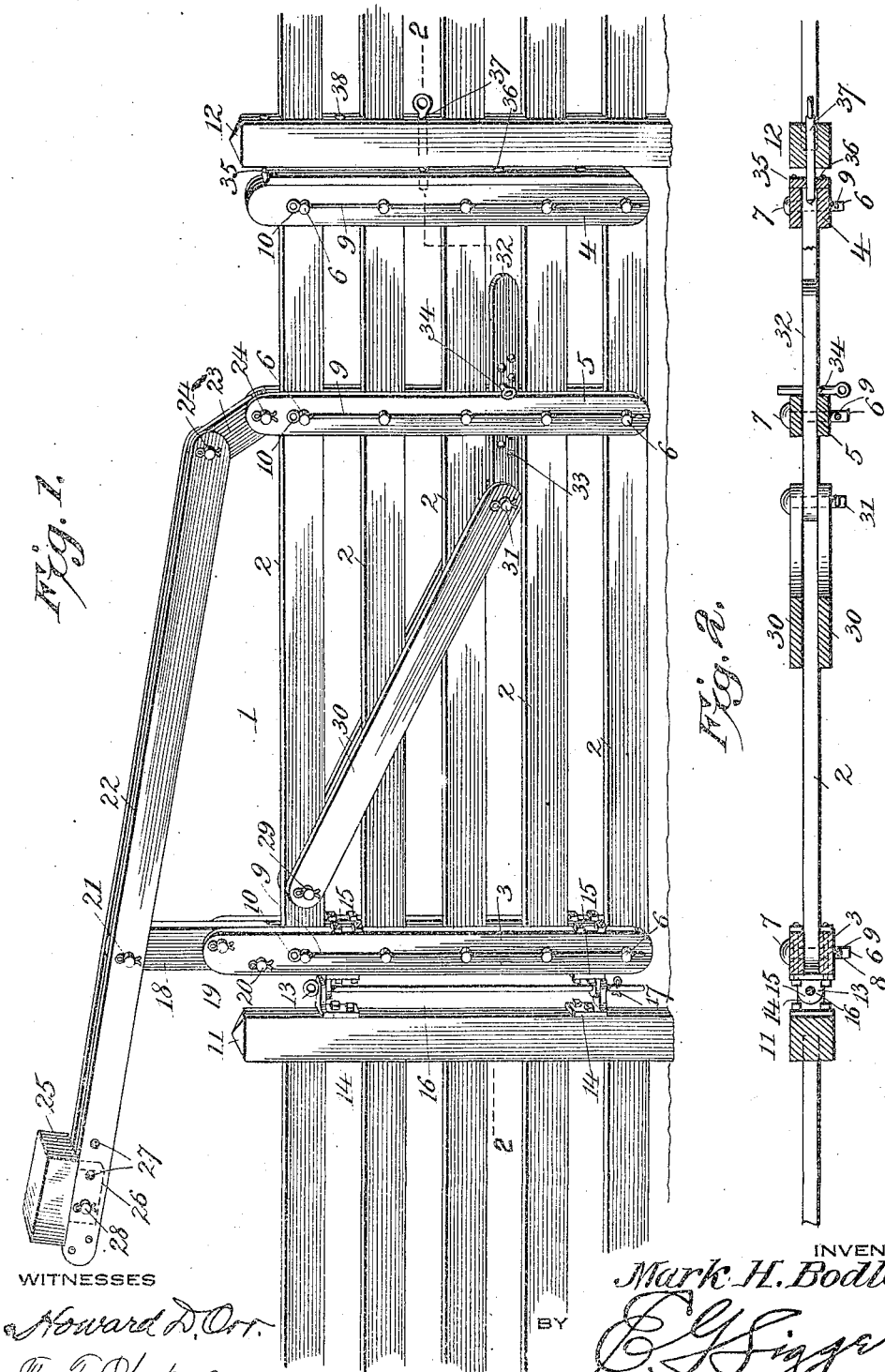

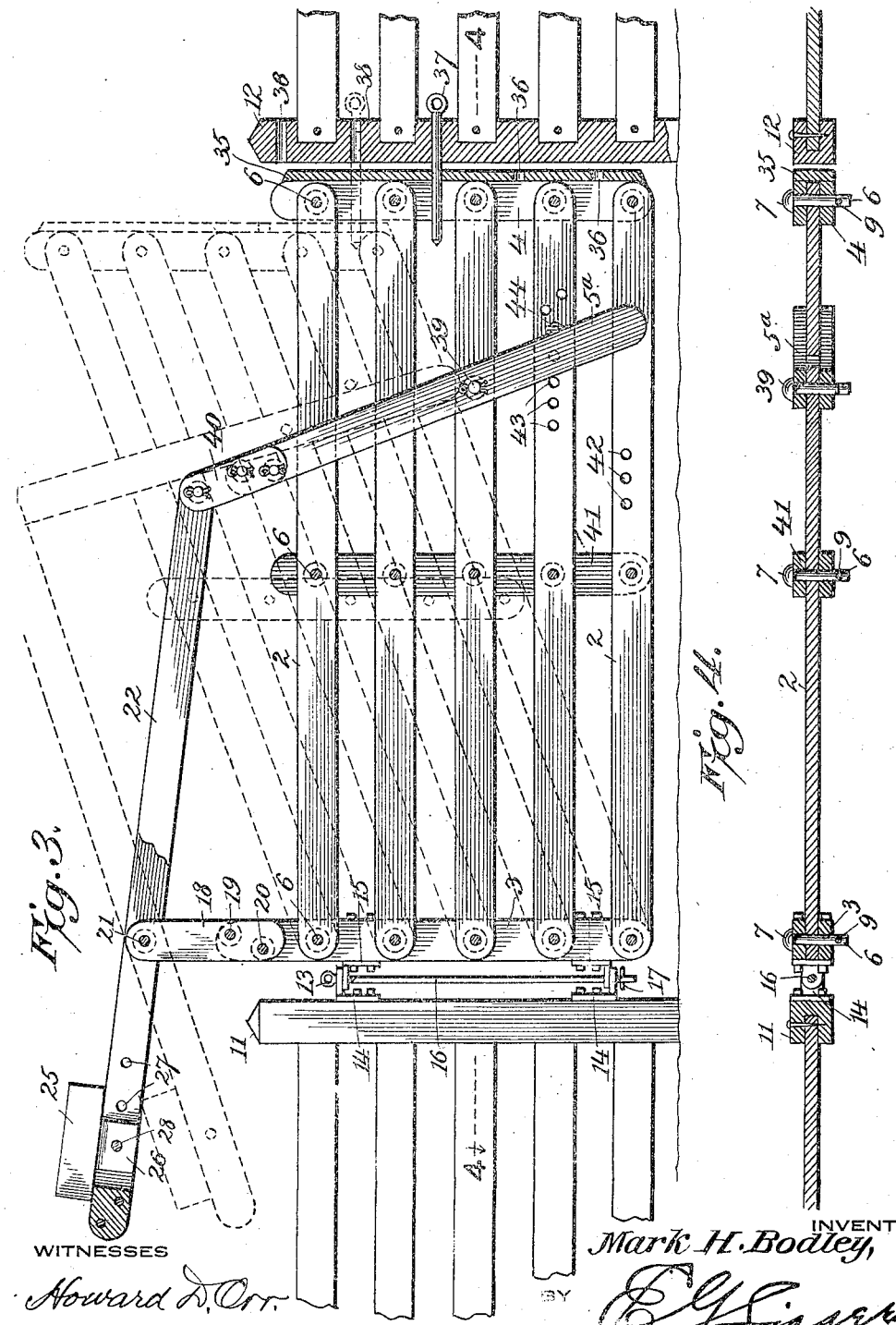

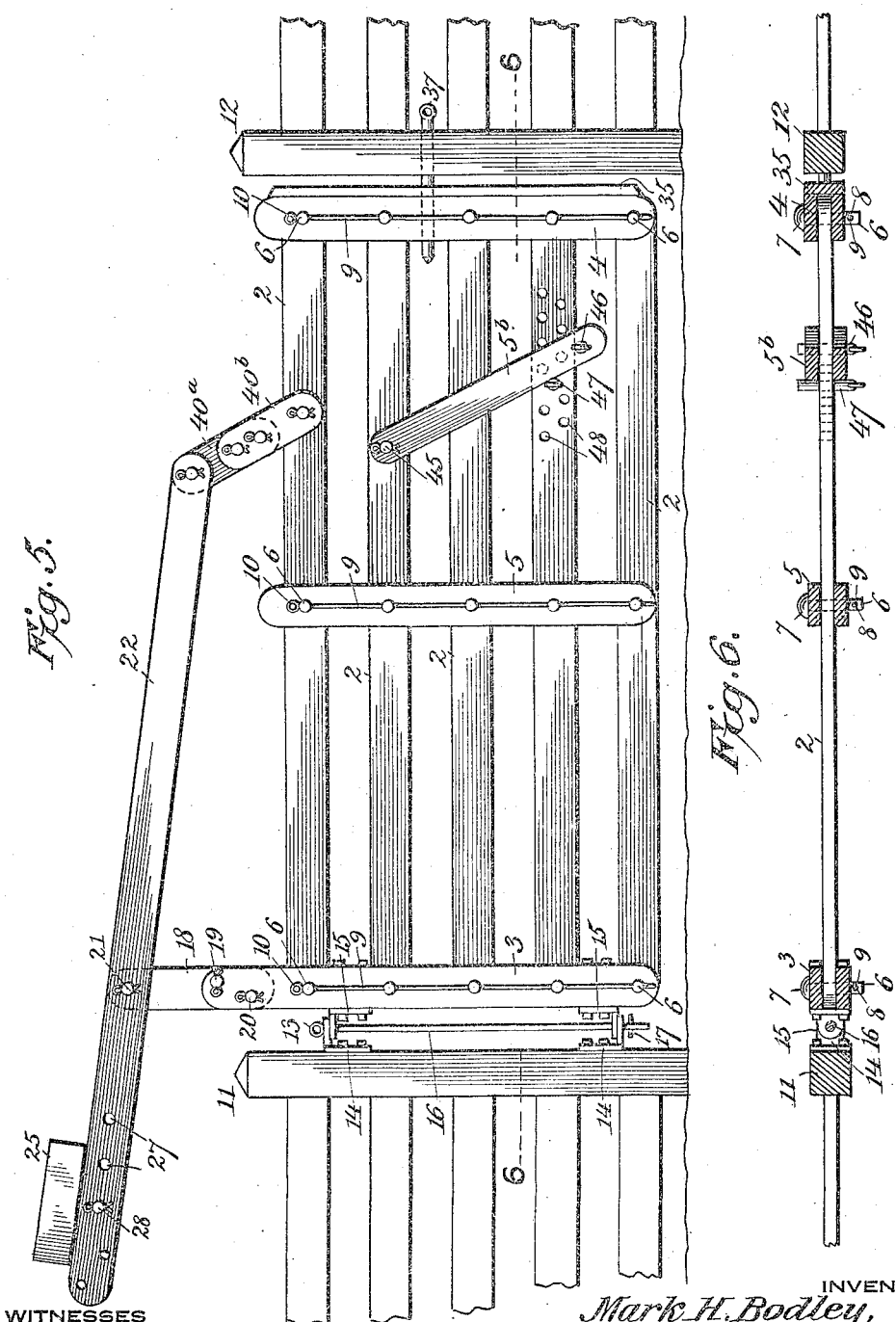

MARK HARRIS BODLEY, OF TYRONE, PENNSYLVANIA.

GATE.

1,351,612.  Specification of Letters Patent.  Patented Aug. 31, 1920.

Application filed October 2, 1919. Serial No. 327,843.

*To all whom it may concern:*

Be it known that I, MARK H. BODLEY, a citizen of the United States, residing at Tyrone, in the county of Blair and State of Pennsylvania, have invented a new and useful Gate, of which the following is a specification.

This invention has reference to gates, and its object is to provide a gate particularly adapted for farms or other like tracts, whereby the gate may be lifted and so be opened without turning it on its hinges and held in such open position to permit the passage of certain stock to the exclusion of others or may be tilted to accommodate the gate to snow-drifts and the like, so that snow-drifts or the like will offer no obstruction to the opening and closing of the gate.

In accordance with the invention the gate is hung upon hinges and is so constructed that the body of the gate may be tilted with respect to the hinged end of the gate, to various extents, permitting the free passage of poultry or small animals to the exclusion of larger animals, or the passage of animals of considerable size to the exclusion of vehicles, or permitting the gate to be opened for passage in the ordinary manner.

The gate is so constructed that it may be readily shipped in the knocked down condition, thereby saving freight and may be readily set up by one who is not especially skilled in the use of tools.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient feature of the invention as expressed in the appended claims.

In the drawings:—

Figure 1 is a perspective view of a gate embodying the invention.

Fig. 2 is a section on the line 2—2 of Fig. 1.

Fig. 3 is an elevation, partly in section of a gate embodying a somewhat different form of the invention from that shown in Fig. 1 and also showing the gate in a tilted position in dotted lines.

Fig. 4 is a section on the line 4—4 of Fig. 3.

Fig. 5 is an elevation of a gate embodying still another form of the invention.

Fig. 6 is a section on the line 6—6 of Fig. 5.

Referring to the drawings there is shown a gate 1 which is formed of a series of bars 2 in superposed order extending through end posts 3, 4 respectively, made up of upright bars spaced apart to as to receive the bars 2 between them. At an intermediate point, which may be nearer to one end of the gate than to the other, is another upright post 5 which also may be made of bars spaced apart so as to pass the bars 2. The bars making up the posts 3, 4 and 5, together with the bars 2, are traversed by pins 6, there being one pin for each bar 2 and the portion of each post 3, 4 and 5 through which the bar extends. In this manner the bars are all pivotally connected together permitting the gate to be collapsed or extended with the pins 6 serving as pivots. One end of each pivot 6 is headed as indicated at 7, while the other end of each pin 6 has a perforation 8. The pins of each post 3, 4 and 5, as the case may be, are arranged to have the holes or perforations 8 alined so as to be traversed by a pin or rod 9, such rod having at one end an eye or head 10 facilitating the handling of the rod and holding it from dropping below a certain point.

The gate 1 is intended to be mounted between fence posts 11 and 12 respectively, the gate being hung on hinges 13 each formed of two hinge brackets 14, 15, fast to the posts 11 and 3 respectively, by any suitable means such as bolts or screws. A rod 16 is utilized as a hinge pintle traversing both sets of brackets 14, 15 respectively, so that but one hinge pintle is needed for the two pair of hinges. As a simple means of maintaining the pintle in place a cotter pin 17 traverses the rod 16 below the lower hinge.

The post 3 is continued above the top of the gate and receives a link 18 between its two members, such link 18 being secured by suitable pins 19 traversed by cotter pins 20, such arrangement constituting a simple but effective means for fastening the parts together and facilitating the assembling or dismantling of the gate.

Pivotally mounted on the upper end of the link 18 by means of a pivot pin 21 is a lever 22 formed of two bars in close parallel relation. The lever 22 is secured at one end by a link 23 to the upper end of the post 5, pins 24 with cotter pin holding means being utilized for the purpose.

At the other end the lever 22 carries a counterweight 25, such counterweight having a tongue 26 fitting between the two bars of the lever 22 and adjustable along the latter. The lever 22 is provided with perforations 27 for the reception of a pin 28 traversing the lever 22 and the tongue 26, whereby the weight may be adjusted to different points along the lever to vary the counterbalancing action of the weight.

Pivotally connected to the topmost bar 2 by a pin 29 is a pair of bars 30 straddling certain of the bars 2 and at the other end connected by a pin 31 to a single bar 32 lodged between two of the bars 2 part of the way up the gate. The bar 32 extends through the post 5 without being secured thereto and is provided with a series of perforations 33, anyone of which may receive a pin 34 to bear against that edge of the bar 5 toward the free end of the gate. That face of the post 4 toward the post 12 has a facing strip 35 fast thereto and this strip is provided with a series of perforations 36 into any one of which may enter a pin 37 traversing the post 12 at a suitable height, say above the mid-height of the post 12, although any particular location is not obligatory further than in a fence similar to that shown in the drawings, the pin 37 should be located between two of the fence bars. The perforations 36 may then be conveniently located each between two of the bars 2. A suitable number of perforations 38 are provided in the post 12 to accommodate the pin 37.

The counterweight 25 is sufficient to about counter-balance the gate or to somewhat underbalance the gate, whereupon the weight of the gate will tend to depress the free end of the gate, the various elements of the gate being pivotally united together. With the pin 34 in a suitable one of the perforations 33 the gate will be held in a substantially horizontal position for the tendency of the gate is to drop at the forward end and the bar 32 will, if not arrested, slide along the two bars 2 between which it is located. If the pin 34 be closer to the post 4 than to the post 3 but still at a distance from the free end of the bar 32 the gate will be about horizontal because of the engagement of the pin 34 with the adjacent edge of the post 5. If the gate be lifted at its forward end the pin 34 may be removed from the perforation 33 and placed in one nearer to the hinged end of the gate and then the forward end of the gate will be held in a higher position, such position being considerably elevated if desirable. If the pin 34 be placed in a perforation 33 close to the post 4 then the free end of the gate may be lowered until the gate tilts downwardly toward the free end before being held from further movement. In this way the gate may be tilted to accommodate itself to sloping land or it may be sufficiently elevated to permit various animals and even horses and cattle from passing through the gate while the gate still remains closed to vehicles or the like.

The structure shown in Fig. 3 is in many respects similar to that shown in Fig. 1 and much of the description already given with reference to Fig. 1 may be considered as applying to Fig. 3, the same reference numerals being employed wherever possible.

Instead of the post 5 a post $5^a$ is used in the structure of Fig. 3 and this post, made up of a pair of bars embracing the gate bars, is connected to the gate, at about the same location as the post 5, by a pivot pin 39. The link 40 similar to the link 23 is employed to join the lever 22 and the post $5^a$ at the upper end of the latter, the link 40 being inflexibly connected to the post $5^a$ so that the post is in effect elongated. In place of the bar 30 of Fig. 1 a post 41 like the posts 3, 4 and 5, pivotally joins all the bars 2 about midway of the length of the gate. The lowermost bars 2 are provided with perforations 42 and the next higher bars 2 have perforations 43, while the pin 44 serves in the same manner as the pin 34 of the gate of Fig. 1 to hold the gate in different positions of elevation while still permitting the gate to swing.

In the structure shown in Fig. 5 the same general characteristics of Fig. 3 are retained with the exception that the lever 22 is pivotally connected directly to the topmost bar 2 by a two-part link $40^a$ and $40^b$. In place of the bar $5^a$ a shorter bar $5^b$ is employed, being pivotally connected by a pin 45 to one of the high bars of the gate, say the next to the highest bar in a five-bar gate, while the lower end of the bar or post $5^b$ is traversed by a removable pin 46 and another pin 47 is employed to traverse any one of a number of perforations 48 in the next to the lowermost bar 2. As the post or bar $5^b$ is moved about the pivot 45 in one direction or the other and the pin 47 is placed in any suitable one of the perforations 48 the gate is elevated or lowered as the case may be.

In the several structures shown the pin 37 is removed and replaced as the gate is adjusted and when the desired adjustment is attained the pin 37 may be inserted, thus holding the gate at any desired height or inclination and closed with relation to the post 12.

In the structure of the gate the various pins employed are preferably made of hardwood, thereby avoiding the possibility of rust or corrosion and binding of the parts. It is usually sufficient to make the pins of about seven-eighths of an inch in diameter with the heads formed thereon. No metallic fastening elements need be used in the construction of the gate except for attaching the facing strip 35.

What is claimed is:—

1. A gate formed of a series of longitudinal bars in superposed order, end posts connecting the bars and to which the latter are pivoted, an intermediate post also connecting the bars and to which the latter are pivoted, other bars extended in the direction of the length of the gate with one bar slidable lengthwise of the gate between two adjacent longitudinal bars and traversing the intermediate post and there provided with perforations for the reception of a stop pin to engage the intermediate post and thereby hold the gate in either a level or different tilted positions.

2. A gate formed of a series of longitudinal bars in superposed order, end posts connecting the bars and to which the latter are pivoted, an intermediate post also connecting the bars and to which the latter are pivoted, other bars extended in the direction of the length of the gate with one bar slidable lengthwise of the gate between two adjacent longitudinal bars and traversing the intermediate post and there provided with perforations for the reception of a stop pin to engage the intermediate post and thereby hold the gate in either a level or different tilted positions, said gate having a hinge structure connected to one end and a lever and counterweight projecting over the hinged end of the gate and carried by said gate.

3. A gate comprising a series of longitudinally disposed superposed bars, end posts joining the bars at the ends thereof with readily removable pivots constituting the joining means and each post consisting of two bars arranged on opposite sides of the gate and connected together by the pivots, a lever carried by the rear post of the gate above the topmost bar of the latter and extending beyond the rear end of the gate, said lever being composed of two bars arranged side by side and spaced apart, a counterweight on the lever adjustable lengthwise of the latter, and a link connecting the other end of the lever to an intermediate point in the topmost bar of the gate, the lever, link and weight being connected to the gate by readily removable fastening means whereby the gate may be collapsed for shipment or storage and readily assembled for use.

4. A gate hinged at its rear end to swing about an upright axis and composed of bars pivoted together for movement of the bars on transverse axes with relation to each other to raise or lower the front end of the gate, a lever carried by the rear end of the gate above the latter and extending lengthwise of the gate beyond its rear end, said lever comprising joined bars in spaced relation and pivotally connected to the top portion of the gate, and a counter-weight on and adjustable lengthwise of the rear end of the lever and in part entering between the bars constituting said lever.

In testimony that I claim the foregoing as my own I have hereto affixed my signature in the presence of two witnesses.

MARK HARRIS BODLEY.

Witnesses:
F. J. Fitzpatrick,
W. J. Haine.